United States Patent [19]

Di Vita

[11] 4,134,639
[45] Jan. 16, 1979

[54] OPTICAL PATH-LENGTH EQUALIZER WITH GRADED REFRACTIVE INDEX

[75] Inventor: Pietro Di Vita, Turin, Italy

[73] Assignee: CSELT - Centro Studi e Laboratori Telecomunicazioni S.p.A., Turin, Italy

[21] Appl. No.: 793,420

[22] Filed: May 3, 1977

[30] Foreign Application Priority Data

May 10, 1976 [IT] Italy .................. 68141 A/76

[51] Int. Cl.² ........................................ G02B 5/14
[52] U.S. Cl. ...................... 350/96.15; 350/96.18; 350/96.31
[58] Field of Search .............. 350/96.18, 96.31, 96.15

[56] References Cited

U.S. PATENT DOCUMENTS 3,980,391  9/1976  Stewart .................. 350/96.18

*Primary Examiner*—Paul A. Sacher
*Assistant Examiner*—Rolf Hille

*Attorney, Agent, or Firm*—Karl F. Ross

[57] ABSTRACT

Signals, especially short pulses, are transmitted by way of cascaded light guides with internally reflecting boundaries (i.e. fibers or foils) between which a transparent body of graded refractive index is interposed. The refractive index of the body varies, on opposite sides of a centerline coinciding with the axes of the aligned guides, according to a parabolic law, increasing from the centerline outwardly over a radial distance $r_o$ and then decreasing in a symmetrical manner over a like radial distance, whereby light rays incident at various angles on an entrance face of the body are deflected onto a generally sinusoidal path which peaks at a radial distance $2r_o$. The axial length of the body equals three quarter-wavelengths of the sine curve whereby substantially axially incident rays emerge from an exit face of the body at a limiting angle $\theta_M$, and vice versa, the radial distance $r_o$ being given by $r_o = s \cdot \tan \theta_M$ where s is the axial distance between the confronting ends of the light guides and the adjoining body faces.

5 Claims, 4 Drawing Figures

OPTICAL PATH-LENGTH EQUALIZER WITH GRADED REFRACTIVE INDEX

FIELD OF THE INVENTION

My present invention relates to an optical equalizer for a system in which signals, especially binary ones represented by short spikes (so-called Dirac pulses), are transmitted with the aid of multimode light guides.

BACKGROUND OF THE INVENTION

A light guide as herein contemplated may be either a single optical fiber, a group of optical fibers arrayed in a flat bundle or ribbon, or a light-conducting foil. In each instance the light guide has internally reflecting boundaries with a critical angle of reflection determined by the difference between the refractive indices of the guide substance and the surrounding medium. As is well known, light rays striking the guide boundary at a glancing angle, not exceeding the critical value, are totally reflected and thus do not leave the confines of the guide. In traveling along their transmission path, they bounce back and forth between opposite guide surfaces and eventually leave the exit end of the guide at an inclination to its axis which depends upon the angle of incidence.

Theoretically, at least, a ray may pass along the axis of a straight guide without internal reflection. Such a ray has the shortest transit time through the guide in comparison with rays undergoing reflection, the longest time being that of a ray exiting from the guide surface at the critical or guidance angle. These relative delays of light rays originating at a common modulated source result at the receiving end in a broadening of the pulses and thus in a distortion of the signal. That distortion, of course, increases with the length of the transmission path.

A variety of equalizers have already been suggested for dealing with this problem. One such equalizer, described by D. C. Gloge in an article entitled "Fiber-Delay Equalization by Carrier Drift in the Detector", *Optoelectronics*, vol. 5, 1973, pages 345-350, operates electronically on the electric pulses derived from the luminous signal at the receiving end; the light rays emerging at different angles from the exit end of an optical fiber are electronically detected in separate zones working into delay lines which introduce compensatory differences in transit time. Such a system, requiring active electronic components, is relatively complex and limited to specific radiation receivers.

In a commonly owned application filed by me jointly with Riccardo Vannucci on 18 Feb. 1977, Ser. No. 770,232, now U.S. Pat. No. 4,094,578, an optical signal-transmission system has been disclosed and claimed in which the equalization of the light paths is carried out with the aid of mirrors interposed between cascaded light guides angularly adjoining one another.

Other solutions, such as those suggested in U.S. Pat. Nos. 3,759,590 and 3,832,030, provide optical equalizers with refractive cones or lenses serving for a compensatory refraction of light rays incident at different angles.

The presence of three or more refractive bodies between confronting guide ends in systems of the last-mentioned type results in a significant attenuation of the luminous radiation, especially for slanting light rays which strike the surfaces of these bodies at almost a glancing angle and are therefore subject to heavy Fresnel losses.

In my copending application Ser. No. 779,821 filed Mar. 21, 1977 there has been disclosed an equalizer comprising two identical transparent bodies of positive refractivity spaced apart along the centerline of the aligned light guides between which the equalizer is disposed, each of these bodies having a cross-section in at least one longitudinal plane of symmetry of the light guides which consists of two symmetrical truncated lens profiles having a boundary on that centerline. That boundary is offset from the optical axes of the truncated lens profiles, these axes thus lying on opposite sides of the centerline; each lens profile extends from the centerline (and therefore also from the aforementioned boundary) to at least a point of interception of a limiting ray converging at the closer light-guide and, the path of such limiting ray extending from that point of interception at a lens profile of one body to the geometrical center of the other body and thence substantially along the centerline to the more distant light-guide end.

OBJECT OF THE INVENTION

The object of my present invention is to provide an equalizer utilizing only a single refractive body between any pair of cascaded light guides forming part of an overall transmission path, with resulting further saving in the cost of the equalizer as well as increased transmission efficiency.

SUMMARY OF THE INVENTION

This object is realized, in accordance with my present invention, by providing such a body with a nonuniform refractive index varying symmetrically from the centerline outwardly within the aforementioned longitudinal plane of symmetry, this body having a transverse entrance face and a transverse exit face spaced by the same distance s from the light-emitting end of one light guide and from the light-collecting end of the other light guide, respectively. The limiting light rays leaving the center of the emitting guide end at a critical angle $\theta_M$ with reference to the centerline strike the entrance face at points spaced from that centerline by a distance $r_o = s \cdot \tan\theta_M$, the refractive index increasing progressively from the centerline outwardly over substantially the distance $r_o$ and thereafter decreasing progressively over a further distance which preferably also equals at least $r_o$ and in any event must be sufficient to deflect the limiting ray within the body back toward the centerline over a generally sinusoidal first path ending substantially tangentially to the centerline at the exit face whereby that ray continues substantially along the centerline to the collecting guide end. On the other hand, thanks to the reciprocity of the ray paths, a central or paraxial ray leaving the emitting guide end substantially along the centerline is deflected within the body over a generally sinusoidal second path which is longitudinally shifted with reference to the first path and ends at the exit face substantially at a distance $r_o$ from the centerline whereby this central ray continues to the collecting guide end substantially at the critical angle $\theta_M$. Thus, the paraxial and limiting rays are effectively transposed to equalize their path lengths; a similar equalization also occurs for the intermediate rays. If the variations of the refractive index of the transparent body on each side of the centerline within the aforementioned longitudinal plane (or within any such plane in the case of a centrally symmetrical guide system) represent a substantially symmetrical function of distance having an inversion point at the distance $r_o$, the various rays paths within the body will be substantially symmetrical about an axis spaced from the centerline by the distance $r_o$. In that case the length of the body between its two transverse faces should be substantially equal to 3/2 times the distance between successive points of intersection of any sinusoidal ray path with that axis, this length being then equal to three quarter-wavelengths of the sine curve represented or approximated by these paths.

The term "light", as herein used, is not necessarily limited to radiation in the visible spectrum.

BRIEF DESCRIPTION OF THE DRAWING

The above and other features of my invention will now be described in detail with reference to the accompanying drawing in which.

SPECIFIC DESCRIPTION

Figure 1:
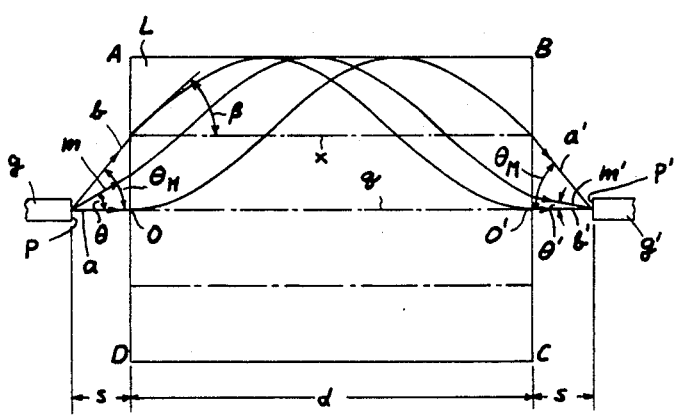
FIG. 1 is a somewhat diagrammatic view of an equalizer according to my invention including a transparent body of varying refractive index inserted between confronting ends of two cascaded light guides.

In FIG. 1 I have shown a light-emitting end of an incoming light guide g and a confronting light-collecting end of an outgoing light guide g', the two guide axes lying on a common centerline q. A transparent body L, symmetrical about centerline q in at least the plane in which the sectional view of FIG. 1 is taken, has a transverse entrance face A–D and a transverse exit face B–C separated from each other by a distance d; these faces are intersected by centerline q at points O and O'. The center P of the emitting end of guide g is separated from entrance face A–D by a distance s; a like distance s separates the exit face B–C from the center P' of the collecting end of guide g'.

Figure 1A:
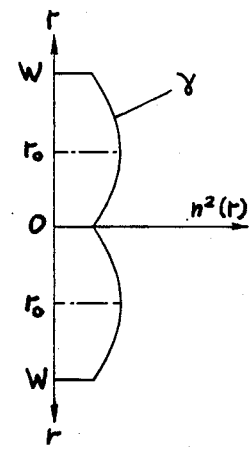
FIG. 1A is a graph showing the variations in the refractive index of the equalizer body.

Body L has a refractive index n(r) varying as a function of distance r from centerline q, the square $n^2(r)$ of that function being represented by a curve $\gamma$ in FIG. 1A. Such a varying index of refractivity can be produced, for example, by the so-called CVD (chemical vapor deposition) technique. Curve $\gamma$ has two symmetrical branches, above and below centerline q, each representing a continuous parabolic function with an inversion point or vertex at a radial distance $r_o$ from the centerline; the index could also vary, however, in small incremental steps rather than continuously. At a radial distance $w = 2r_o$, constituting half the minimum width of body L, the curve has a discontinuity causing internal reflection; thus, at lines A–B and D–C (where r = w), the body may terminate, undergo a sharp reduction of its refractive index or be provided with a reflecting layer.

The law of variation of the refractive index n(r) is so chosen that, as illustrated in FIG. 1, a limiting light ray b leaving the guide g at point P and including the critical angle $\theta_M$ with the centerline q will strike the face A–D of body L at a point where the refractive index n(r) has its maximum value, i.e. at distance $r_o$ from the centerline. On entering the optically denser body L, the ray will continue along a less steep path and, encountering progressively smaller refractive indices in the outer zone of the body beyond a line x lying at radial distance $r_o$, will be deflected along a substantially sinusoidal curve with a peak in the vicinity of boundary A–B (or D–C in the case of a ray symmetrical to the one here contemplated). The resulting sine curve, symmetrical about an axis represented by line x, intersects that axis a second time at a distance d/3 from exit face B–C so as to have a negative peak in the vicinity of centerline q at that exit face. From there the ray continues substantially along the centerline, as indicated at b', to point P' of guide g'.

Theoretically, at least, a ray leaving the point P exactly along centerline q would pass straight through the body L to point P'. However, a paraxial ray a inclined ever so slightly with reference to the centerline will encounter a progressively increasing refractive index within the inner zone of body L, i.e. up to line x, and will thereupon follow a substantially sinusoidal path which is essentially the mirror image of curve b, b' and which therefore encounters the exit face B–C at its intersection with axis x, i.e. at distance $r_o$ from the centerline. From that exit point the ray then continues along a line a', including the critical angle $\theta_M$ with centerline q, to point P' of guide g'.

An intermediate ray m, inclined at a lesser angle $\theta$ when emitted from guide g at point P, is deflected along a similar sinusoidal ray path lying between those of rays a and b, continuing from the exit face to point P' along a straight line at an angle $\theta'$ conjugate with angle $\theta$. Thus, practically all the rays emitted at point P are collected at point P' after undergoing a change in inclination substantially equalizing their respective path lengths through guides g and g'.

A preferred law of variation of the refractive index, advantageous from both an optical and a technological viewpoint, is given by the parabolic function $$n^2(r) = n^2(r_o) - \alpha^2 (r-r_o)^2 \qquad (1)$$

where $\alpha^2$ is a constant obtainable from equation (1) by choosing r = O, whence $$\alpha^2 = \frac{n^2(r_o) - n^2(0)}{r_o^2} \qquad (1')$$

From FIG. 1 it will be further apparent that the relationship between distances s and w is given by $$w = 2r_o = 2s \cdot \tan\theta_M \qquad (2)$$

If the medium separating the light guides g and g' from body L has a refractive index n', ray b upon entering the body L will include with axis x an angle $\beta$ given by $$\sin\beta = \sin\frac{n'\Theta_M}{n(r_o)} \qquad (3)$$

From this relationship, and from the nature of the three-quarter sine curve constituting the further path of ray b, we can determine the length d as $$d = \frac{3\pi}{2} r_o \frac{\sqrt{n^2(r_o) - n'^2 \sin^2\Theta_M}}{n' \sin\Theta_M} \qquad (4)$$

or, taking into consideration equation (2), $$d = \frac{3\pi}{2} s \frac{\sqrt{n^2(r_o) - n'^2 \sin^2\Theta_M}}{n' \cos\Theta_M} \quad (5)$$

If the intervening medium is air so that $n' = 1$, equation (5) becomes $$d = \frac{3\pi}{2} s \frac{\sqrt{n^2(r_o) - \sin^2\Theta_M}}{\cos\Theta_M} \quad (5')$$

For small values of $\theta_M$, i.e. with $\sin\theta_M \ll 1$ and $\cos\theta_M \approx 1$, equation (5') simplifies to $$d \approx \frac{3\pi}{2} s \cdot n(r_o) \quad (5'')$$

From the foregoing relationships the actual ray paths can be determined on the basis of the well-known eikonal equation, i.e.

$$|\Delta W|^2 = n^2(r)$$

where W is the wave function.

Figure 2:
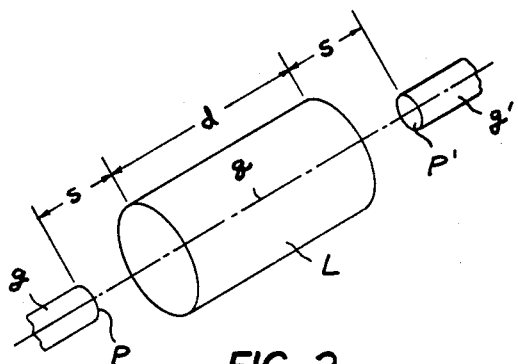
FIG. 2 is a perspective view of the system of FIG. 1 with the light guides constituted by fibers.

In FIG. 2 the guides g and g' have been shown as filaments of circular cross-section centered on line q, body L being cylindrical about the same line.

Figure 3:
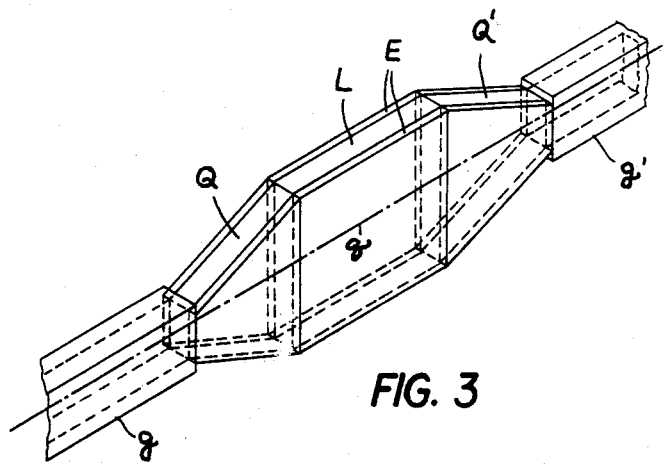
FIG. 3 is a perspective view generally similar to that of FIG. 2 but relating to a system whose light guides are in the form of foils.

As shown in FIG. 3, on the other hand, the guides g and g' may also be flat or ribbon-shaped, with cores of generally rectangular cross-section whose minor dimension is so small as to give rise to only a single mode of propagation in a plane transverse to the plane of FIG. 1. In this instance the equalizer body L is also flat, its parallel lateral surfaces being coplanar with the major sides of the light guides; the refractive index of body L is then constant along any line perpendicular to these major surfaces.

FIG. 3 further shows two transparent members Q and Q' interposed between guides g, g' and body L, these members having a refractive index matching that of the guides. Members Q, Q' and body L are laterally coated with continuous reflecting layers E of different refractive index forming extensions of the guide sheaths. Such members, centrally symmetrical about line q, could of course also be utilized between the two guides and the equalizer body in the system of FIG. 2. Since portions of body L lying in the vicinity of corners A, B, C, D in FIG. 1 will not be traversed by useful light rays, the body could be truncated at these portions; the intervening members Q and Q' shown in FIG. 3 could be similarly cut off just beyond ray paths b, a' and their mirror images.

I claim:

1. In an optical signal-transmission system, in combination:
   two aligned light guides with confronting ends respectively emitting and collecting bundles of light rays whose limiting rays include a critical angle $\theta_M$ with a common centerline of said light guides in at least one longitudinal plane of symmetry thereof; and
   an equalizer between said light guides comprising a unitary transparent body with a refractive index varying symmetrically within said plane from said centerline outwardly, said body having an entrance face transverse to said centerline spaced by a distance s from the light-emitting end of one of said light guides and an exit face spaced by said distance s from the light-collecting end of the other of said light guides, the limiting rays leaving the center of said light-emitting end within said plane striking said entrance face at points spaced from said centerline by a middle distance $r_o = s \cdot \tan\theta_M$, said refractive index increasing progressively within said plane from said centerline outwardly over substantially said middle distance $r_o$ and thereafter decreasing progressively to the periphery of said body, spaced from said centerline by a distance of $2r_o$, to an extent sufficient to deflect each of said limiting rays within said body back toward said centerline over a generally sinusoidal first path which ends substantially tangentially to said centerline at said exit face whereby each limiting ray continues substantially along said centerline to the light-collecting end of the other of said light guides whereas a central ray leaving said light-emitting end substantially along said centerline is deflected within said body over a generally sinusoidal second path longitudinally shifted with reference to said first path which ends at said exit face substantially at said distance $r_o$ from said centerline whereby said central ray continues substantially at said critical angle $\theta_M$ to said light-collecting end, said refractive index varying throughout said body on each side of said centerline according to a substantially symmetrical function of distance from said centerline having an inversion point at said middle distance $r_o$ whereby said first and second paths are substantially symmetrical about an axis spaced from said centerline by said distance $r_o$, the length of said body between said transverse faces being substantially equal to 3/2 times the distance between successive points of intersection of either of said paths with said axis.

2. The combination defined in claim 1 wherein the square of said refractive index on either side of said centerline decreases on opposite sides of said axis in proportion to the square of the distance from said axis.

3. The combination defined in claim 1 wherein the spaces separating said light guides from said transverse spaces are occupied by a transparent medium having substantially the same refractive index as said light guides.

4. The combination defined in claim 1 wherein said light guides are fibers, said body being centrally symmetrical and having the same refractive index at any given distance from said centerline.

5. The combination defined in claim 1 wherein said light guides are flat, said body having parallel lateral surfaces substantially coplanar with the major sides of said light guides, the refractive index of said body being constant along any line perpendicular to said major surfaces.